United States Patent
Kobayashi et al.

(10) Patent No.: US 6,773,802 B2
(45) Date of Patent: Aug. 10, 2004

(54) BIAXIALLY ORIENTED LAMINATED POLYESTER FILM AND MAGNETIC RECORDING MEDIUM

(75) Inventors: Ieyasu Kobayashi, Sagamihara (JP); Shinji Muro, Sagamihara (JP); Hirofumi Murooka, Sagamihara (JP)

(73) Assignee: Teijin Limited, Osaka (JP)

( * ) Notice: Subject to any disclaimer, the term of this patent is extended or adjusted under 35 U.S.C. 154(b) by 73 days.

(21) Appl. No.: 10/182,646

(22) PCT Filed: Nov. 30, 2001

(86) PCT No.: PCT/JP01/10506

§ 371 (c)(1),
(2), (4) Date: Jul. 31, 2002

(87) PCT Pub. No.: WO02/45959

PCT Pub. Date: Jun. 13, 2002

(65) Prior Publication Data

US 2003/0180562 A1 Sep. 25, 2003

(30) Foreign Application Priority Data

Dec. 5, 2000 (JP) ........................................ 2000-369741

(51) Int. Cl.⁷ .......................... B32B 18/00; B32B 19/02; B32B 27/36
(52) U.S. Cl. ....................... 428/323; 428/325; 428/327; 428/328; 428/331; 428/332; 428/336; 428/480; 428/694 SL

(58) Field of Search .................................. 428/141, 212, 428/216, 323, 325, 327, 328, 331, 332, 336, 480, 694 SL; 524/513

(56) References Cited

FOREIGN PATENT DOCUMENTS

| EP | 0950681 | * 10/1997 |
|---|---|---|
| JP | 60-029930 A | 2/1985 |
| JP | 60-115022 A | 6/1985 |
| JP | 09-314744 A | 12/1997 |
| JP | 10-000751 A | 1/1998 |
| JP | 10-156937 A | 6/1998 |

* cited by examiner

*Primary Examiner*—Paul Thibodeau
(74) *Attorney, Agent, or Firm*—Sughrue, Mion, PLLC

(57) ABSTRACT

A biaxially oriented layered polyester film which is excellent in suitability for winding and processability while retaining the flatness of the flat surface and which gives a magnetic recording medium, especially a metal coating type high-recording-density magnetic recording medium, having excellent electromagnetic characteristics. The biaxially oriented layered polyester film comprises a second polyester layer and superposed on one side thereof a first polyester layer containing an ester of a $C_{12}$ or higher aliphatic monocarboxylic acid with a polyhydric alcohol and three inert particulate materials differing in average particle diameter. In the film, one of the Young's moduli respectively in the longitudinal direction and transverse direction is 6 GPa or higher and the other is 4 GPa or higher.

31 Claims, 1 Drawing Sheet

F I G. 1
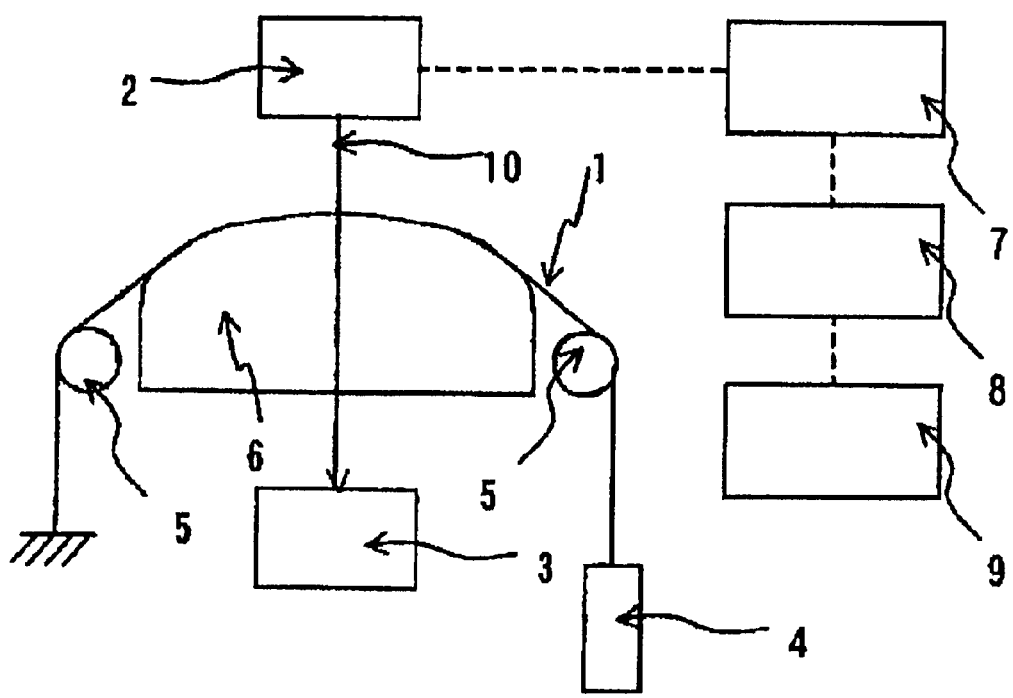

BIAXIALLY ORIENTED LAMINATED POLYESTER FILM AND MAGNETIC RECORDING MEDIUM

FIELD OF THE INVENTION

The present invention relates to a biaxially oriented laminated polyester film and a magnetic recording medium. More specifically, it relates to a biaxially oriented laminated polyester film having excellent anti-block properties, winding properties and processability and a magnetic recording medium comprising the same and having excellent electromagnetic conversion characteristics.

DESCRIPTION OF THE PRIOR ART

A biaxially oriented polyester film typified by a polyethylene terephthalate film is used for various purposes, particularly as a base film for magnetic recording media, thanks to its excellent physical and chemical properties.

Along with recent efforts made to increase the density and capacity of a magnetic recording medium, a more flat and thinner base film is desired. Particularly a recently developed multi-layer metal magnetic tape having performance equivalent to a deposited magnetic tape requires a base film having extremely high surface flatness.

However, when the surface of a base film is flattened to retain excellent electromagnetic conversion characteristics, its slipperiness or air squeezability deteriorates. As a result, when the film is to be rolled, it tends to be wrinkled or debris, thereby making it extremely difficult to roll the film nicely. When the slipperiness of the base film is low in the film processing step after the film is rolled, the friction of the base film with a metal roll in contact with the base film increases, whereby the film may be wrinkled, a magnetic layer may not be formed smoothly, or the film may not be calendered smoothly.

To improve the slipperiness of a polyester film, the following methods are employed: (1) one in which inert particles are precipitated from the catalyst residue in a raw material polymer in the production process and (2) one in which inert particles are added separate from the catalyst residue. Both methods provide fine irregularities to the surface of the film. As the size of the particles contained in the film increases, larger irregularities are formed on the surface of the film and as the content of the particles grows, a larger number of irregularities are formed on the surface of the film. Therefore, when the size or content of the particles is increased, the surface of the film becomes rough and the slipperiness of the film is improved. However, as described above, the surface of a base film is desired to be as flat as possible in order to improve electromagnetic conversion characteristics. When the surface of a base film is rough and a magnetic recording medium is formed using the base film, protrusions on the surface of the base film thrust up the surface of a magnetic layer after the formation of the magnetic layer, thereby deteriorating electromagnetic conversion characteristics. Consequently, the larger the size and content of the particles contained in the base film, the higher the surface roughness of the base film becomes, thereby deteriorating electromagnetic conversion characteristics but improving slipperiness.

As means of improving both slipperiness and electromagnetic conversion characteristics which are antipodal properties, it is proposed to form different surface forms on the two respective sides of the film. Stated more specifically, there is widely known a biaxially oriented laminated polyester film having a flat layer capable of improving electromagnetic conversion characteristics on one side to be coated with a magnetic layer and a roughened layer for improving slipperiness on the opposite side.

However, even when the side (flat side) to be coated with a magnetic layer of the above biaxially oriented laminated polyester film is flattened and the opposite side (to be referred to as "rough side" hereinafter) is roughened, if the film is thin, the roughened side exerts an influence upon the magnetic layer forming side (flat side), undulates the flat side and impairs the flatness of the flat side according to the type, size and amount of particles to be contained in the rough side layer. Particularly for the latest high-density magnetic recording medium, a metal calender having a high linear pressure is used to meet demand for a more flat magnetic layer, whereby a problem that particles existent in the above rough side greatly thrust up the flat side to reduce its flatness is becoming very serious.

To reduce the number of protrusions on the flat side thrust up from the rough side, there have been proposed a method for reducing the particle diameter of particles to be contained in the rough side and a method for reducing the amount of particles to be added. However, in the former case, sufficient air squeezability cannot be obtained because the height of protrusions formed on the rough side is low whereas in the latter case, sufficient film slipperiness cannot be obtained because the density of protrusions formed on the rough side is low. When the film is rolled, it is vertically wrinkled in the former case and its surface becomes debris in the latter case, thereby making it impossible to obtain a sufficiently high product yield. Stated more specifically, in order to further improve electromagnetic conversion characteristics, there is proposed a flat layer containing substantially no particles as part of an effort to greatly flatten the magnetic layer forming side of the film. In this case, as the running properties of the flat side are unsatisfactory in the tape forming step, the film is wrinkled in that step and the product yield is greatly reduced.

Thus, a film having very high flatness on the flat side and film slipperiness at the same time has not yet been provided.

When the film is used in a magnetic recording tape of linear recording system, the flattening of the rough side is desired in addition to the flattening of the above flat side and film slipperiness as described above. This is because a countermeasure against track dislocation is necessary along with an increase in the density of tracks and the positioning accuracy of tracks is improved by recording a tracking servo signal on the back coat side which is the rough side. Therefore, when the film is used in a magnetic recording tape of linear recording system, the roughening of the back coat side is restricted and a high level of film slipperiness must be achieved by flattening both the flat side and rough side.

SUMMARY OF THE INVENTION

It is an object of the present invention to provide a biaxially oriented laminated polyester film which overcomes the above defects of the prior art, has excellent winding properties and processability through the flattening of the flat side and can exhibit excellent electromagnetic conversion characteristics when a magnetic recording medium, particularly a metal coated high recording density magnetic recording medium is formed therefrom.

It is another object of the present invention to provide a biaxially oriented laminated polyester film which has excellent winding properties and processability while meeting new demand for the flattening of not only the flat side but also the rough side and can exhibit excellent electromagnetic conversion characteristics when a magnetic recording medium, particularly a metal coated high recording density magnetic recording medium is formed therefrom.

It is still another object of the present invention to provide a magnetic recording medium which comprises the biaxially oriented laminated film of the present invention as a base film and has excellent electromagnetic conversion characteristics.

Other objects and advantages of the present invention will become apparent from the following description.

According to the present invention, firstly, the above objects and advantages of the present invention are attained by a biaxially oriented laminated polyester film comprising: (A) a first polyester layer which contains (1) at least three types of inert particles: 0.005 to 0.1 wt % of first inert particles having an average particle diameter of 0.4 to 0.7 $\mu$m and a relative standard deviation of particle size distribution of 0.5 or less, 0.05 to 0.3 wt % of second inert particles having an average particle diameter of 0.2 $\mu$m or more and less than 0.4 $\mu$m and a relative standard deviation of particle size distribution of 0.5 or less, and 0.1 to 0.5 wt % of third inert particles having an average particle diameter of 0.01 $\mu$m or more and less than 0.2 $\mu$m; and 0.05 to 0.25 wt % of an ester compound of an aliphatic monocarboxylic acid having 12 or more carbon atoms and a polyhydric alcohol, in a ratio satisfying the following expression:

$$-0.5x+0.15 \leq y \leq -0.5x+0.3$$

wherein x is the content (wt %) of the second inert particles and y is the content (wt %) of the ester compound,
the above three types of inert particles showing three clearly distinguishable particle size peaks within the above average particle diameter ranges in a particle size distribution curve, respectively,
and which has (2) a center plane average surface roughness (WRa) of 5 to 20 nm and a 10-point average surface roughness (WRz) of 100 to 300 nm, and
(B) a second polyester layer having a center plane average surface roughness (WRa) of 1 to 10 nm, formed on the first polyester layer,
and having (C) one of Young's moduli in lengthwise and crosswise directions of 6 GPa or more and the other Young's modulus of 4 GPa or more.

According to the present invention, secondly, the above objects and advantages of the present invention are attained by a magnetic recording medium comprising the biaxially oriented laminated polyester film of the present invention and a magnetic layer formed on the surface of the second polyester layer of the biaxially oriented laminated polyester film.

According to the present invention, thirdly, the above objects and advantages of the present invention are attained by a magnetic recording medium comprising the biaxially oriented laminated polyester film of the present invention, a magnetic layer formed on the surface of the second polyester layer of the biaxially oriented laminated polyester film and a layer for recording a tracking servo signal, formed on the surface of the first polyester layer of the biaxially oriented polyester laminated film.

BRIEF DESCRIPTION OF THE DRAWING

FIG. 1 is a schematic diagram of a device for measuring a dimensional change in a crosswise direction under load in a longitudinal direction.

THE PREFERRED EMBODIMENT OF THE INVENTION

The present invention will be described in detail hereinbelow. A description is first given of the biaxially oriented laminated polyester film.
<First Polyester Layer>
In the present invention, the polyester forming the first polyester layer is particularly preferably an aromatic polyester. Examples of the aromatic polyester include polyethylene terephthalate, polyethylene isophthalate, polytetramethylene terephthalate, poly-1,4-cyclohexylene dimethylene terephthalate and polyethylene-2,6-naphthalene dicarboxylate. Out of these, polyethylene terephthalate and polyethylene-2,6-naphthalene dicarboxylate are preferred.

These polyesters may be homopolyesters or copolyesters. In the case of a copolyester, the comonomer of polyethylene terephthalate or polyethylene-2,6-naphthalene dicarboxylate is other diol component such as diethylene glycol, propylene glycol, tetramethylene glycol, hexamethylene glycol, neopentyl glycol, polyethylene glycol, 1,4-cyclohexane dimethanol or p-xylylene glycol, other dicarboxylic acid component such as adipic acid, sebacic acid, phthalic acid, isophthalic acid, terephthalic acid (for polyethylene-2,6-naphthalene dicarboxylate), 2,6-naphthalenedicarboxylic acid (for polyethylene terephthalate) or 5-sodium sulfoisophthalic acid, or oxycarboxylic acid component such as p-oxyethoxybenzoic acid. The amount of the comonomer is preferably 20 mol % or less, more preferably 10 mol % or less based on the total of all the dicarboxylic acid components. A copolyester comprising polyethylene terephthalate or polyethylene-2,6-naphthalene dicarboxylate as the main component may comprise a polyfunctional compound having three or more functional groups such as trimellitic acid or pyromellitic acid. The amount of the polyfunctional compound is preferably such that the polymer is substantially linear, for example, 2 mol % or less based on the total of all the dicarboxylic acid components. People of ordinary skill in the art will be able to understand comonomers which can be applied in the same manner as above for other copolyesters which do not comprise polyethylene terephthalate or polyethylene-2,6-naphthalene dicarboxylate as the main component.

The above polyester is known per se and can be produced by a method known per se. The above polyester has an intrinsic viscosity measured in an o-chlorophenol solution at 35° C. of preferably 0.4 to 0.9, more preferably 0.5 to 0.7, particularly preferably 0.55 to 0.65.

The first polyester layer of the biaxially oriented laminated polyester film of the present invention contains an ester compound of an aliphatic monocarboxylic acid having 12 or more carbon atoms and a polyhydric alcohol in an amount of 0.05 to 0.25 wt %.

The aliphatic monocarboxylic acid must have 12 or more carbon atoms. The upper limit of the number of carbon atoms is preferably no more than 34. When the number of carbon atoms is smaller than 12, the obtained ester compound becomes unsatisfactory in terms of heat resistance, whereby the aliphatic monocarboxylic acid is easily decomposed under the heating condition for dispersing the ester compound in the first polyester layer. Examples of the aliphatic monocarboxylic acid having 12 or more carbon atoms include lauric acid, tridecylic acid, myristic acid, pentadecylic acid, palmitic acid, heptadecylic acid, stearic acid, nonadecanoic acid, arachic acid, behenic acid, lignoceric acid, cerotic acid, montanic acid, melissic acid, hentriacontanoic acid, petroselinic acid, oleic acid, erucic acid, linoleic acid and acid mixtures containing these.

The polyhydric alcohol component is a polyhydric alcohol having two or more hydroxyl groups, preferably a polyhydric alcohol having three or more hydroxyl groups from the viewpoint of heat resistance. When a monoalchol is used as the alcohol component, the ester compound become unsatisfactory in terms of heat resistance. Preferred examples of the polyhydric alcohol having two hydroxyl groups include ethylene glycol, propylene glycol, trimethylene glycol, 1,4-butanediol, 1,5-pentandiol, 1,6-hexanediol, 1,7-heptanediol, 1,8-octanediol, 1,9-nonanediol, 1,10-decanediol, diethylene glycol, triethylene glycol and polyethylene glycol. Preferred examples of the polyhydric alcohol having 3 or more hydroxyl groups include glycerin, erythritol, threitol, pentaerythritol, arabitol, xylitol, talitol, sorbitol and mannitol.

The ester compound of the above aliphatic monocarboxylic acid and polyhydric alcohol is a monoester, diester or triester, depending on the number of hydroxyl groups of the polyhydric alcohol. From the viewpoint of heat resistance, a diester is more preferred than a monoester and a triester is more preferred than a diester. Preferred examples of the ester compound include sorbitan tristearate, pentaerythritol tribehenate, pentaerythritol distearate, glycerin tristearate, glycerin tripalmitate and polyoxyethylene distearate.

The above ester compound of an aliphatic monocarboxylic acid and a polyhydric alcohol includes a partial ester compound as understood from the above examples. The partial ester compound is obtained by esterifying a higher fatty acid having 12 or more carbon atoms with a polyhydric alcohol and then saponifying the esterified product with a metal hydroxide having 2 or more hydroxyl groups. Examples of the partial ester compound include Wax E•Wax OP, Wax O, Wax OM and Wax FL (trade names of Hoechst AG) obtained by saponifying a montanic acid diol ester with calcium hydroxide. These (partial) ester compounds may be used alone or in combination of two or more as a matter of course.

In the present invention, the amount of the (partial) ester compound to be contained in the first polyester layer is 0.05 to 0.25 wt %, preferably 0.1 to 0.2 wt % based on the weight of the first layer. When the amount of the (partial) ester compound is smaller than 0.05 wt %, the effect of improving winding properties is not obtained. When the amount is larger than 0.25 wt %, the film tends to slip excessively in the processing step, resulting in deteriorated handling properties, and a large amount of an ester wax bleeding out to the surface of the first layer is transferred to the surface of the second layer in contact with the surface of the first layer when the film is rolled, thereby reducing adhesion between the surface of the second layer and a metal coating layer when a magnetic layer such as a metal coating layer is formed on the surface of the second layer.

In the present invention, the first polyester layer further contains inert particles. The inert particles comprise first inert particles, second inert particles and third inert particles. The first inert particles have an average particle diameter of 0.4 to 0.7 $\mu$m, preferably 0.5 to 0.6 $\mu$m, and a relative standard deviation of viscosity distribution of 0.5 or less.

The second inert particles have an average particle diameter of 0.2 $\mu$m or more and less than 0.4 $\mu$m, preferably 0.25 to 0.35 $\mu$m and a relative standard deviation of particle size distribution of 0.5 or less. The third inert particles have an average particle diameter of 0.01 $\mu$m or more and less than 0.2 $\mu$m, preferably 0.1 to 0.15 $\mu$m.

Examples of the inert particles include (1) heat resistant polymer particles (particles of at least one of crosslinked silicone resin, crosslinked polystyrene, crosslinked acrylic resin, melamine-formaldehyde resin, aromatic polyamide resin, polyimide resin, polyamide-imide resin and crosslinked polyesters), and fine particles of inorganic compounds such as (2) metal oxides (aluminum sesquioxide, titanium dioxide, silicon dioxide (silica), magnesium oxide, zinc oxide, zirconium oxide, etc.), (3) metal carbonates (magnesium carbonate, calcium carbonate, etc.), (4) metal sulfates (calcium sulfate, barium sulfate, etc.), (5) carbon (carbon black, graphite; diamond, etc.), and (6) clay minerals (kaolin, clay, bentonite, etc.).

Out of these, the first inert particles are preferably crosslinked polymer particles. The crosslinked polymer particles are preferably of at least one resin selected from the group consisting of crosslinked silicone resin, crosslinked polystyrene resin and crosslinked acrylic resin.

Similarly, the second inert particles are preferably crosslinked polymer particles. The crosslinked polymer particles are also preferably of at least one resin selected from the group consisting of crosslinked silicone resin, crosslinked polystyrene resin and crosslinked acrylic resin.

Further, the third inert particles are of at least one selected from the group consisting of crosslinked silicone resin, crosslinked polystyrene resin, crosslinked acrylic resin, silica and alumina. The above third inert particles except alumina preferably have a relative standard deviation of particle size distribution of 0.5 or less.

As for a combination of inert particles, the first inert particles and the second inert particles are both preferably crosslinked silicone resin particles and the third inert particles are preferably alumina particles in this case.

The first polyester layer contains the first inert particles in an amount of 0.005 to 0.1 wt %, preferably 0.01 to 0.05 wt %, more preferably 0.01 to 0.03 wt %, the second inert particles in an amount of 0.05 to 0.3 wt %, preferably 0.1 to 0.25 wt % and the third inert particles in an amount of 0.1 to 0.5 wt %, preferably 0.1 to 0.3 wt %.

The above three types of inert particles which differ from one another in average particle diameter are clearly distinguished from one another by their clearly distinguishable particle size peaks existent in the respective average particle diameter ranges of a particle size distribution curve.

In the present invention, out of the three types of inert particles which differ from one another in average particle diameter, the second inert particles must be contained to ensure that the content x (wt %) thereof and the content y (wt %) of the above ester compound should satisfy the following relational expression.

$$-0.5x+0.15 \leq y \leq -0.5x+0.3$$

By satisfying this relational expression, a film having excellent electromagnetic conversion characteristics while retaining excellent winding properties and transferability can be provided.

The first polyester layer of the present invention has a center plane average roughness (WRa) of 5 to 20 nm, preferably 5 to 15 nm, more preferably 8 to 13 nm and a 10-point average surface roughness (WRz) of 100 to 300 nm, preferably 150 to 250 nm. WRa and WRz can be basically controlled to the above ranges with the particle diameters and contents of the above three types of inert particles which differ from one another in average particle diameter and the type and content of the above ester compound used in the present invention. However, when inert particles having an extremely wide particle size distribution are used, WRa and WRz may be outside the above ranges and deteriorate electromagnetic conversion characteristics. Therefore, WRa and WRz must be specified in the present invention.

The water contact angle of the surface not in contact with the second polyester layer of the first polyester layer is preferably in the range of 68 to 90°, more preferably 70 to 85°, more preferably 70 to 80°, the most preferably 75 to 75°. When the water contact angle is smaller than 68°, the effect of improving winding properties is hardly obtained. When the water contact angle is larger than 90°, coating becomes nonuniform in the step of applying a back coat layer.

<Second Polyester Layer>

The polyester of the second polyester layer is identical to the polyester of the first polyester layer.

The second polyester layer may contain or may not contain inert particles.

The second polyester layer underlies the first polyester layer and has a WRa of 1 to 10 nm.

WRa is preferably 3 to 8 nm, particularly preferably 5 to 7 nm. WRz is preferably 30 to 150 nm, more preferably 50 to 150 nm, particularly preferably 80 to 130 nm. When this surface roughness WRa is more than 10 nm, the surface of the magnetic layer becomes rough and satisfactory electromagnetic conversion characteristics cannot be obtained. When the surface roughness WRa is less than 1 nm, the surface becomes too flat, slipperiness over a pass roll or calender roll deteriorates, the film is wrinkled, a magnetic layer cannot be applied smoothly, or the film cannot be calendered smoothly.

The above WRa and WRz values of the second polyester layer can be attained by containing the following fine particles in the second polyester layer.

(1) preferably 0.01 to 0.4 wt %, more preferably 0.02 to 0.35 wt %, much more preferably 0.05 to 0.3 wt % of fourth inert particles having an average particle diameter of 0.05 to 0.55 $\mu$m, preferably 0.1 to 0.5 $\mu$m, more preferably 0.1 to 0.3 $\mu$m and a relative standard deviation of particle size distribution of 0.5 or less (2) preferably 0.01 to 0.2 wt %, more preferably 0.02 to 0.15 wt %, much more preferably 0.04 to 0.1 wt % of fifth inert particles having an average particle diameter of 0.2 to 0.55 $\mu$m, preferably 0.2 to 0.4 $\mu$m, more preferably 0.25 to 0.35 $\mu$m and a relative standard deviation of particle size distribution of 0.5 or less, and preferably 0.01 to 1.0 wt %, more preferably 0.02 to 0.5 wt %, much more preferably 0.05 to 0.15 wt % of sixth inert particles having an average particle diameter of 0.01 to 0.3 $\mu$m, preferably 0.05 to 0.2 $\mu$m, more preferably 0.10 to 0.15 $\mu$m The average particle diameter of the fifth inert particles is 0.1 to 0.3 $\mu$m larger than the average particle diameter of the sixth inert particles.

In the case of (1), crosslinked polymer fine particles or inert inorganic fine particles may be used as the fourth inert particles. Illustrative examples of the fourth inert particles are the same as those listed for the first polyester layer.

When the average particle diameter of the fourth inert particles is smaller than 0.05 $\mu$m or the amount of the fourth inert particles is smaller than 0.01 wt %, the surface of the second polyester layer becomes too flat, its slipperiness over a pass roll or calendar roll deteriorates, the film is wrinkled, a magnetic layer cannot be applied smoothly, or the film cannot be calendered smoothly. When the average particle diameter is larger than 0.55 $\mu$m or the amount is larger than 0.4 wt %, the surface of the magnetic layer becomes rough and satisfactory electromagnetic conversion characteristics cannot be obtained.

In the case of (2), the fifth inert particles are preferably crosslinked polymer particles. Examples of the crosslinked polymer particles are the same as those listed for the first polyester layer. The sixth inert particles may be crosslinked polymer particles or inert inorganic particles. Illustrative examples of these are the same as those listed for the first polyester layer.

Preferred examples of the sixth inert particles are the same as those of the third inert particles.

<Biaxially Oriented Laminated Polyester Film>

The biaxially oriented laminated polyester film of the present invention which comprises the above first polyester layer and second polyester layer has one of Young's moduli in lengthwise and crosswise directions of 6 GPa or more and the other Young's modulus of 4 GPa or more. Specifically, it is (i) a film having a Young's modulus in a lengthwise direction (or longitudinal direction) of 6 GPa or more and a Young's modulus in a crosswise direction (or transverse direction) of 4 GPa or more, the Young's modulus in the lengthwise direction being equal to or higher than the Young's modulus in the crosswise direction, or (ii) a film having a Young's modulus in a lengthwise direction of 4 GPa or more and a Young's modulus in a crosswise direction of 6 GPa or more, the Young's modulus in the crosswise direction being higher than the Young's modulus in the lengthwise direction.

The film (i) has a Young's modulus in the longitudinal direction of 6 GPa or more, preferably 7 GPa or more, particularly preferably 7.5 GPa or more. When the Young's modulus in the longitudinal direction is lower than 6 GPa, the strength in the longitudinal direction of the obtained magnetic tape lowers, the shrinkage in the transverse direction of the tape becomes large when strong force is applied in the longitudinal direction at the time of recording or reproduction, and the dislocation of a track becomes large in the case of a magnetic tape of linear recording system, thereby causing a recording or reproduction error. The film has a Young's modulus in the transverse direction of 4 GPa or more, preferably 5 GPa or more, more preferably 6 GPa or more. When the Young's modulus in the transverse direction is lower than 4 GPa, in the case of a magnetic tape of linear recording system, the dimensional change in the crosswise direction of the tape becomes large at the time of temperature and humidity variations, and a recording or reproduction error occurs by the dislocation of a track. Further, when the obtained film is used as a base film for a magnetic tape of linear recording system, the Young's modulus in the longitudinal direction of the film must be equal to or higher than the Young's modulus in the transverse direction to reduce the elongation in the longitudinal direction of the film. When the Young's modulus in the longitudinal direction is lower than the Young's modulus in the transverse direction, the Young's modulus in the longitudinal direction is low, whereby when tension is applied in the longitudinal direction, the film readily elongates in the longitudinal direction and shrinks in the transverse direction disadvantageously. When the Young's modulus in the longitudinal direction is high and the Young's modulus in the transverse direction is to be made higher than the Young's modulus in the longitudinal direction, elongation stress becomes large in the film formation step, the film breaks often, and production becomes difficult. The term "longitudinal direction" as used herein means the film formation direction and "transverse direction" means a direction perpendicular to the film formation direction and the film thickness direction. The longitudinal direction of the film may be referred to as "lengthwise direction" and the transverse direction of the film may be referred to as "crosswise direction".

The above film (i) has a total of Young's moduli in longitudinal and transverse directions of preferably 10 to 20

GPa, more preferably 12 to 16 GPa. When the total of Young's moduli in longitudinal and transverse directions is lower than 10 GPa, the strength of the magnetic tape lowers, whereby the tape easily breaks, the dimensional change becomes large at the time of temperature and humidity variations, a recording or reproduction error occurs by the dislocation of a track, and accordingly a satisfactory high density magnetic recording medium cannot be obtained. When the total of Young's moduli in longitudinal and transverse directions is higher than 20 GPa, the draw ratio becomes too high at the time of film formation, whereby the film may often break and the product yield may greatly lower.

As for the above film (i), a first polyester which contains three types of inert particles and an ester compound and a second polyester which contains or does not contain inert particles are each filtered highly accurately, laminated together in a molten state in an extrusion nozzle or at an upstream side of the nozzle (the former is called "multi-manifold system" and the latter is called "feed block system"), coextruded into the form of a film from the nozzle at a temperature of melting point (Tm) to (Tm+70)° C. and solidified by quenching with 10 to 70° C. cooling rolls to produce an unstretched laminated film. Thereafter, the unstretched laminated film is stretched to 2 to 7 times, preferably 4 to 6 times in a longitudinal direction at a temperature of (Tg−10) to (Tg+70)° C. (Tg: glass transition temperature of a polyester) and to 3 to 6 times, preferably 3.5 to 5.5 times in a transverse direction at a temperature of (Tg) to (Tg+70)° C. in accordance with a commonly used method. Further, the film may be optionally re-stretched in the longitudinal direction and/or the transverse direction. That is, it may be stretched in two stages, three stages, four stages or multiple stages. The preferred total draw ratio (total draw ratio in the longitudinal direction x total draw ratio in the transverse direction) is 15 to 30 times, specifically 20 to 30 times. Since the Young's modulus in the longitudinal direction (EMD)≧Young's modulus in the transverse direction (ETD) is easily ensured, the draw ratio in the longitudinal direction is preferably equal to or higher than the draw ratio in the transverse direction.

When this film is heat set at a temperature of (Tg+70) to (Tm−10)° C. (Tm: melting point of a polyester), for example, 180 to 250° C. in the case of a polyethylene terephthalate film, for crystallization, excellent dimensional stability is provided. The heat setting time is preferably 1 to 60 seconds.

The above film (ii) must have a Young's modulus in the longitudinal direction of 4 GPa or more, preferably 4.5 GPa or more, particularly preferably 5.0 GPa or more. When the Young's modulus in the longitudinal direction is lower than 4 GPa and strong stress is applied to the magnetic tape in a moment, the tape elongates and deforms disadvantageously.

The film must have a Young's modulus in the transverse direction of 6 GPa or more, preferably 7 GPa or more, more preferably 8 GPa or more. When the Young's modulus in the transverse direction is lower than 6 GPa, the strength of the obtained tape becomes unsatisfactory, contact between the tape and the head becomes weak, the electromagnetic conversion characteristics of the tape may deteriorate, the end portion of the tape is damaged and deformed into a seaweed-like shape, and further the tape is contacted to the tape transverse direction restriction guide, whereby the end portion of the tape is bent, thereby impairing the characteristic properties of the tape disadvantageously.

The above film (ii) is mainly used as a base film for a magnetic recording medium of helical recording system and must have a higher Young's modulus in the transverse direction (ETD) than a Young's modulus in the longitudinal direction (EMD) to reduce its elongation in the transverse direction.

The above film (ii) has a total of Young's moduli in longitudinal and transverse directions of preferably 10 to 20 GPa, more preferably 12 to 16 GPa. When the total of Young's moduli in longitudinal and transverse directions is lower than 10 GPa, the strength of the magnetic tape lowers, the tape easily breaks, the edge of the tape is greatly damaged, or a recording or reproduction error occurs. Therefore, a satisfactory high density magnetic medium is hardly obtained. When the total of Young's moduli in longitudinal and transverse directions is higher than 20 GPa, the draw ratio becomes high at the time of film formation, the film often breaks, and the product yield greatly lowers.

The above film (ii) can be produced in the same manner as the above film (i) except that an unstretched laminated film is stretched to 2.5 to 4.5 times, preferably 3.0 to 4.0 times in the longitudinal direction at a temperature of (Tg−10) to (Tg+70)° C. (Tg: glass transition temperature of polyester) and then to 3.5 to 8.0 times, preferably 4.0 to 7.5 times in the transverse direction at a temperature of (Tg) to (Tg+70)° C. in accordance with a commonly used method.

In the production of the above films (i) and (ii), the first polyester layer or the second polyester layer may optionally contain additives other than the above inert particles or ester compound, such as a stabilizer, colorant and volume resistivity modifier for a molten polymer. Particularly when the inert particles are to be contained, what have an average particle diameter measured by one or both of the following method (a) and (b) and a relative standard deviation of particle size distribution existent within the above range are preferably used.

(a) In the case of inert particles having an average particle diameter of 60 nm or more, the average particle diameter of the inert particles is measured using the CP-50 centrifugal particle size analyzer of Shimadzu Corporation. The "sphere equivalent diameter" of particles equivalent to 50 mass percent is read from the integral curve of the particle diameter and amount of particles of each size calculated from the obtained centrifugal sedimentation curve and taken as the above average particle diameter (nm) ("Particle Size Measurement Technology" published by Nikkan Kogyo Shimbun Co., Ltd., pp. 242–247, 1975). The standard deviation is obtained from the integral curve.

(b) In the case of inert particles having an average particle diameter of 60 nm or more, the average particle diameter of the inert particles is measured by using light scattering paper. That is, the "sphere equivalent diameter" obtained by the Nicomp Model 270 Submicron Particle Sizer of Nicomp Instruments Inc. of particles which account for 50% of the total of all the particles is taken as average particle diameter (nm). The relative standard deviation is also obtained.

The first polyester layer of the biaxially oriented laminated polyester film of the present invention has a thickness of preferably 0.1 to 2.5 μm and the second polyester layer has a thickness of preferably 1.0 to 9.5 μm. The thickness ratio of the first polyester layer to the second polyester layer is preferably 1:1 to 1:20.

Further, the total thickness of the biaxially oriented laminated polyester film of the present invention is preferably 2 to 10 μm, more preferably 3 to 7 μm, particularly preferably 4 to 6 μm.

<Adhesive Layer>

The biaxially oriented laminated polyester film of the present invention may have an adhesive layer as a coating layer on the surface of the second polyester layer to improve adhesion or slipperiness.

The coating layer preferably contains a polyester-based, polyurethane-based or polyacrylic aqueous resin (such as a water-soluble resin or water-dispersible resin) in an amount of 50 wt % or more of the total solids content.

The coating layer may contain seventh inert particles. Examples of the seventh inert particles to be contained in the coating layer include inorganic particles such as colloidal silica, and organic particles such as crosslinked acrylic resin particles, silicone resin particles and polystyrene particles. Organic particles are more preferred than inorganic particles from the viewpoint of chipping resistance. The average particle diameter of the seventh inert particles is preferably 5 to 100 nm, more preferably 5 to 50 nm, particularly preferably 5 to 30 nm. The content of the seventh inert particles is preferably 0.5 to 40 wt %, more preferably 1 to 30 wt %, particularly preferably 5 to 20 wt % based on the weight of the coating solid content. The seventh inert particles are preferably as spherical in shape and uniform in size as possible.

The coating layer contains a surfactant in an amount of preferably 1 to 30 wt %, more preferably 5 to 20 wt %, particularly preferably 5 to 15 wt % of the total solids content. The thickness (solid content) of the coating layer is preferably 1 to 50 nm, more preferably 1 to 30 nm, particularly preferably 3 to 20 nm.

The formation of the coating layer is preferably carried out by an in-line coating system in which the coating solution is applied after uniaxial stretching in the step of forming a polyester film and dried at the time of biaxial stretching or an off-line coating system in which the coating solution is applied to a biaxially oriented film. The in-line coating system is more preferred from the viewpoint of forming a coating film. The coating technique is not particularly limited and may be roll coating, die coating or the like.

When the coating solution to be applied is an aqueous coating solution, the solid content of the solution is preferably 0.2 to 8 wt %, more preferably 0.3 to 6 wt %, particularly preferably 0.5 to 4 wt %. In the case of an aqueous coating solution, a component other than the above components, such as a surfactant, stabilizer, dispersant, ultraviolet light absorber or thickener may be added in limits not prejudicial to the effect of the present invention.

<Magnetic Recording Medium>

The biaxially oriented laminated polyester film of the present invention is advantageously used as a base film for a magnetic recording medium, for example, a digital magnetic recording medium of linear recording system or helical recording system.

According to the present invention, there is provided a magnetic recording medium which comprises the biaxially oriented laminated polyester film of the present invention and a magnetic layer formed on the surface of the second polyester layer of the biaxially oriented laminated polyester film or the surface of an adhesive layer on the second polyester layer. The magnetic recording medium of the present invention may have a layer for recording a tracking servo signal on the surface of the first polyester layer.

The biaxially oriented laminated polyester film of the present invention can be changed into a metal coated magnetic recording medium for high-density recording which has excellent electromagnetic conversion characteristics such as output at a short-wavelength range, S/N and C/N, few drop outs and a low error rate by applying a coating solution prepared by uniformly dispersing iron or needle-like fine magnetic powders (metal powders) containing iron as the main component into a binder such as polyvinyl chloride or vinyl chloride-vinyl acetate copolymer to the surface of the second polyester layer to form a magnetic layer having a thickness of 1 μm or less, preferably 0.1 to 1 μm, and optionally further forming a back coat layer on the surface of the first polyester layer. Optionally, a tracking servo signal may be recorded on the back coat layer to produce a magnetic recording medium which rarely experiences the dislocation of a track. A non-magnetic layer may also be formed on the surface of the second polyester layer as a layer underlying the above metal powder-containing magnetic layer by applying a coating solution prepared by dispersing fine titanium oxide particles or the like in the same organic binder as that of the magnetic layer. This metal coated magnetic recording medium is extremely useful as a high density magnetic recording medium, particularly a magnetic tape of linear recording system such as LTO, DLT or Super-DLT.

EXAMPLES

The following examples are provided for the purpose of further illustrating the present invention. Physical property values and characteristic properties in the present invention were measured and defined by the following methods.

(1) Young's Modulus

The film is cut to a width of 10 mm and a length of 15 cm, this obtained sample is pulled by an Instron type universal tensile tester at a chuck interval of 100 mm, a pull rate of 10 mm/min and a chart rate of 500 mm/min, and the Young's modulus is calculated from the tangent of a rising portion of the obtained load-elongation curve.

(2) Surface Roughness (WRa, WRz)

Using the non-contact 3-D roughness meter (NT-2000) of WYKO Co., Ltd., the surface roughness is measured at 10 points (number (n) of measurements) under such conditions as a measurement area of 246.6 μm×187.5 μm (0.0462 mm$^2$) and a measurement magnification of ×25, and the center plane average roughness (WRa) and 10-point average roughness (WRz) are obtained with surface analysis software incorporated in the roughness meter.

The center plane average roughness (WRa) is calculated from the following equation.

$$WRa = \sum_{k=1}^{m} \sum_{j=1}^{n} |Z_{jk} - \bar{Z}|/(m \cdot n)$$

$$\text{provided } \bar{Z} = \sum_{k=1}^{m} \sum_{j=1}^{n} Z_{jk}/(m \cdot n)$$

wherein $Z_{jk}$ is a height on a 2-D roughness chart at a j-th position and a k-th position in a measurement direction (measurement length: 246.6 μm) and a direction perpendicular to the measurement direction (measurement length: 187.5 μm) when these directions are divided into m and n sections, respectively.

The 10-point average roughness (WRz) is an average value calculated from the roughnesses of the highest 5 peaks (Hp) and the lowest 5 valleys (Hv) based on the following equation.

$$WRz = [(Hp1+Hp2+Hp3+Hp4+Hp5)-(Hv1+Hv2+Hv3+Hv4+Hv5)] \times 1/5$$

(3) Contact Angle

This is measured using the contact angle measuring instrument of Kyowa Kagaku Co., Ltd. The film sample is left at a temperature of 25° C. and a humidity of 50% for 24 hours, 5 mg of distilled water is dropped on the film sample, and the film sample is photographed from a horizontal direction after 20 seconds. The angle formed by the film and the tangent of the water drop on the water drop side is taken as contact angle (°).

(4) Content of Ester Compound in Film (4-1) In Case of Polyethylene Terephthalate Film (PET)

30 mg of the film sample is dissolved in 0.5 ml of a mixed solvent of $CF_3COOD$ (trifluoroacetate deuteride) and $CDCl_3$ (chloroform deuteride) (1:1) and the resulting solution is measured 1,024 times by $^1$H-NMR at 600 MHz. The integral value of peaks derived from an ester compound (the integral value of peaks detected near a chemical shift value of 2.5 ppm in the case of sorbitan tristearate) based on 100 of the integral value of peaks derived from a terephthalic acid unit is inserted into the expression of the measured calibration curve to obtain the amount of the ester compound. As for the laminated film, the thickness of the laminated film is measured by the method to be described in the item (7) hereinafter and the thickness of the layer containing the ester compound is calculated from the ratio of the thickness of the layer to the total thickness to obtain the amount of the ester compound. As for a sample which is difficult to measure the thickness of the laminated film, the film layer containing the ester compound is chipped off and the amount of the ester compound is directly obtained by the above method.

(4-2) In Case of Polyethylene-2,6-naphthalate Film (PEN)

30 mg of the film sample is dissolved in 0.5 ml of a mixed solvent of $CF_3COOD$ (trifluoroacetate deuteride) and $CDCl_3$ (chloroform deuteride) (1:1) and the resulting solution is measured 1,024 times by $^1$H-NMR at 600 MHz. The integral value of peaks derived from an ester compound (the integral value of peaks detected near a chemical shift value of 2.5 ppm in the case of sorbitan tristearate) based on 100 of the integral value of peaks derived from the aromatic ring proton of a 2,6-naphthalenedicarboxylic acid unit is inserted into the expression of the measured calibration curve to obtain the amount of the ester compound. As for the laminated film, the thickness of the laminated film is measured by the method to be described in the item (7) hereinafter and the thickness of the layer containing the ester compound is calculated from the ratio of the thickness of the layer to the total thickness to obtain the amount of the ester compound. As for a sample which is difficult to measure the thickness of the laminated film, the film layer containing the ester compound is chipped off and the amount of the ester compound is directly obtained by the above method.

(5) Average Particle Diameter of Particles (5-1) Average Particle Diameter of Particles Contained in Film The polyester is removed from the film surface layer by a low-temperature plasma ashing process (for example, the PR-503 of Yamato Kagaku Co., Ltd.) to expose particles. The process conditions are selected to ensure that the polyester is ashed and the particles are not damaged. The exposed particles are observed through a SEM (Scanning Electron Microscope) at a magnification of about ×10,000 to analyze an image (light and shade formed by the particles) of the particles with an image analyzer (for example, QTM900 of Cambridge Instrument Co., Ltd.) so as to obtain the area circle equivalent diameters (Di) of at least 5,000 (n) particles by changing the observation site. The particle size distribution curve of the particles is drawn from the obtained results to calculate the proportion of the number of particles of each peak (the area of each peak is defined by the valley portions of the distribution curve as boundaries). The number average value represented by the following expression is obtained from the measurement results of the particle diameters and the number of particles existent in the area of each peak and taken as the average particle diameter (DA) of the particles. In the case of particles existent in the film in an agglomerated state (for example, alumina particles), the particle diameter of the agglomerated particles (secondary particle diameter) is measured to obtain an average particle diameter (DA). The type of particles is identified by the quantitative analysis of a metal element by SEM-XMA or ICP.

$$DA = \left(\sum_{i=1}^{n} Di\right)/n$$

(5-2) Relative Standard Deviation of Average Particle Diameter of Particles

The relative standard deviation is obtained from the number (n) of particles in each peak area and the area circle equivalent diameter (Di) measured in (5-1) above based on the following equation.

$$\text{relative standard deviation} = \sqrt{\frac{\sum_{i=1}^{n}(Di-DA)^2}{n}} \Big/ DA$$

wherein Di is the area circle equivalent diameter (μm) of each particle, DA is the average value of the area circle equivalent diameters $$\left(=\frac{\sum_{i=1}^{n} Di}{n}\right)(\mu m)$$

and n is the number of particles.

The particle size distribution of the inert particles existent in the film is preferably sharp in the present invention. When the inert particles are particles monodispersed in a film, such as inert crosslinked polymer particles or silica particles, the relative standard deviation of particle size distribution of the particles is preferably 0.5 or less, more preferably 0.4 or less, particularly preferably 0.3 or less. When the inert particles are particles dispersed in a film in an agglomerated state, such as alumina particles, the average particle diameter of the agglomerated particles (secondary particle diameter) is preferably 0.05 to 0.5 μm, particularly preferably 0.05 to 0.3 μm.

(6) Content of Particles (6-1) Total Content of Particles in Each Layer 100 g samples are obtained by chipping the first polyester layer and the second polyester layer of the laminated polyester film, a solvent which dissolves the polyesters and not the particles is selected to dissolve the samples, the particles are separated from the polyesters by centrifugation, and the weight ratio (wt %) of the particles to each of the samples is taken as the total content of the particles in each layer.

(6-2) Total Content of Inorganic Particles in Each Layer

When inorganic particles are contained in the laminated polyester film, 100 g samples are obtained by chipping the first polyester layer and the second polyester layer and burnt in a platinum crucible heated at 1,000° C. for more than 3 hours, and the burnt product in the crucible is mixed with terephthalic acid (powder) to form a 50 g tablet-like plate. The count value of each element contained in this plate is calculated from the prepared calibration curve of each element using wavelength dispersion type fluorescent X-rays to determine the total content of inorganic particles in each layer. The X-ray tube for measuring fluorescent X-rays is preferably a Cr tube and an Rh tube may be used for the measurement. The X-ray output is set at 4 kW and the spectral crystal is changed for each element to be measured. When different types of inorganic particles are existent, the content of each type of inorganic particles is determined by this measurement.

(6-3) Content of Each Type of Particles in Each Layer (When Inorganic Particles are Not Existent)

When inorganic particles are not existent in the layers, the proportion of particles existent in each peak area is calculated from the proportion of the number of particles constituting each peak, the average particle diameter of the particles and the density of the particles obtained in (5-1) above, and the content (wt %) of the particles existent in each peak area is obtained from the obtained value and the total content of particles in each layer obtained in (6-1) above.

The densities of typical heat resistant polymer particles are as follows.

| density of crosslinked silicone resin: | 1.35 g/cm$^3$ |
| density of crosslinked polystyrene resin: | 1.05 g/cm$^3$ |
| density of crosslinked acrylic resin: | 1.20 g/cm$^3$ |

The density of the resin can be measured in accordance with, for example, the method described in "Fine Particle Handbook: Asakura Shoten, p.150, 1991" with a pycnometer by further separating particles which have been centrifugally separated from the polyester by the method (6-1).

(6-4) Content of Each Type of Particles in Each Layer (When Inorganic Particles are Existent)

When inorganic particles are existent in the layer, the content of heat resistant polymer particles in each layer and the content of inorganic particles in each layer are calculated from the total content of particles in each layer obtained in (6-1) above and the total content of inorganic particles in each layer obtained in (6-2) above, respectively, the content (wt %) of heat resistant polymer particles is obtained by the above method (6-3), and the content (wt %) of inorganic particles is obtained by the above method (6-2).

(7) thicknesses of first polyester layer, second polyester layer and whole laminated film The total thickness of the film is measured at 10 random points by a micrometer and the average value of the measurement data is used. As for the thickness of the first polyester layer, using a secondary ion mass spectrometer (SIMS), the concentration ratio (M+/C+) of a metal element (M+) derived from particles having the highest concentration out of particles contained in the film of a portion from the surface layer excluding a coating layer to a depth of 5,000 nm to the hydrocarbon (C+) of the polyester is taken as the concentration of particles to analyze the portion from the surface to a depth of 5,000 nm in the thickness direction. The particle concentration of the surface layer is low because the surface is an interface but becomes higher as the distance from the surface increases. In the case of the present invention, the particle concentration becomes a stable value of 1 and then increases to become a stable value of 2, or decrease monotonously. Based on this distribution curve, the depth which provides a particle concentration of (stable value of 1+stable value of 2)/2 in the former case or the depth which provides a particle concentration of ½ of the stable value of 1 (this depth is larger than the depth which provides a stable value of 1) in the latter case is taken as the thickness of the first polyester layer ($\mu$m).

The measurement of the first polyester layer was carried out under the following conditions by the 6300 secondary ion mass spectrometer (SIMS) of PERKINELMER INC.

| type of primary ions: | O$^{2+}$ |
| primary ion acceleration voltage: | 12 kV |
| primary ion current: | 200 nA |
| luster area: | 400 $\mu$m |
| analytical area: | 30% of gate |
| measurement vacuum degree: | 6.0 × 10$^{-9}$ Torr |
| E-GUNN: | 0.5 kV - 3.0 A |

When the particles which are contained the most in the portion from the surface layer to a depth of 5,000 nm are organic polymer particles other than silicone resin particles, it is difficult to measure them with SIMS. Therefore, the same concentration distribution curve as described above is measured by FT-IR (Fourier transform infrared spectrometry) or XPS (X-ray photoelectron spectrometry) depending on some types of particles while etching from the surface to obtain the thickness of the first polyester layer ($\mu$m).

The thickness of the second polyester layer is obtained by subtracting the thickness of the coating layer and the thickness of the first polyester layer from the above-described total thickness.

(8) Winding Properties

After winding conditions at the time of slitting are optimized, 30 rolls of films having a width of 1,000 mm and a length of 6,000 m are slit at a rate of 150 m/min, rolls without irregularities, protrusions and wrinkles on the surface of the films after slitting are accepted, and the winding properties of the rolls are evaluated based on the following criteria.

| ○: | 25 or more accepted rolls |
| X: | 24 or less accepted rolls |

(9) Dimensional Change in Crosswise Direction Under Load in Longitudinal Direction A film slit to a width of ½ inch (lengthwise direction of the film slit to ½ inch=longitudinal direction of the film) is set in the measuring instrument shown in FIG. 1 at an ambient temperature of 22° C. and an ambient humidity of 60%. Gold has been deposited on the surface of the sample (1) slit to ½ inch by sputtering so that its outer diameter can be measured with the laser outer diameter measuring instruments (2) and (3) (body: model 3100, sensor: model 3060) of Keyence Co., Ltd., and a weight (4) of 20 g, 80 g, 160 g or 240 g is attached to one side of the film in this state (the other side is fixed) to measure the width of the film with detectors (2) and (3) so as to obtain a shrinkage factor (ppm) under each load from the following equation.

$$\text{Shrinkage factor}(ppm) = (W_0 - W_1) \times 10^6 / W_0$$

wherein $W_0$ is the length (mm) in a crosswise direction of the film under a load of 0 g and $W_1$ is the length (mm) in the crosswise direction of the film under each load.

The shrinkage factor (ppm/g) under each load is calculated from shrinkage data (ppm) under each load (g) obtained from the above equation. The measurement is carried out 10 (n) times and the average value of the measurement data is obtained and evaluated based on the following criteria.

| ⊚: | less than 8 (ppm/g) |
|---|---|
| ○: | 8 or more and less than 10 (ppm/g) |
| X: | 10 (ppm/g) or more |

In FIG. 1, the numerals represent the following.

1 measurement sample
2 light emitting portion of an optical sensor (LS-3036 of Keyence Co., Ltd.)
3 light receiving portion of an optical sensor (LS-3036 of Keyence Co., Ltd.)
4 load
5 free roll
6 glass plate
7 measuring instrument (LS-3100 of Keyence Co., Ltd.)
8 analog/digital converter
9 personal computer
10 laser beam

(10) Temperature Expansion Coefficient ($\alpha t$)

The film sample is cut to a length of 15 mm and a width of 5 mm in the transverse direction of the film and the cut sample is set in the TMA3000 of Shinku Riko Co., Ltd. to be pre-treated at 60° C. in a nitrogen atmosphere for 30 minutes and cooled to room temperature. Thereafter, the temperature is raised from 25° C. to 70° C. at a rate of 2° C./min and the length of the sample is measured at each temperature to calculate the temperature expansion coefficient ($\alpha t$) of the film from the following equation in order to evaluate it based on the following criteria.

$$\alpha t = \{(L_2 - L_1)/(L_0 \times \Delta T)\} \times 10^6 + 0.5 \text{(note)}$$

wherein $L_1$ is the length (mm) of the sample at 40° C., $L_2$ is the length (mm) of the sample at 60° C., $L_0$ is the initial length (mm) of the sample, and $\Delta T$ is 60−40=20° C.
(Note): temperature expansion coefficient of quartz glass ($\times 10^6$)

| ⊚: | less than 10 ($\times 10^{-6}$/° C.) |
|---|---|
| ○: | 10 ($\times 10^{-6}$/° C.) or more and less than 25 ($\times 10^{-6}$/° C.) |
| X: | 25 ($\times 10^{-6}$/° C.) or more |

(11) Production and Electromagnetic Conversion Characteristics of Magnetic Tape

A magnetic coating containing needle-like iron particles are applied to the surface of the second polyester layer of the biaxially oriented laminated polyester film to a thickness of 0.5 μm and treated in a DC magnetic field. A back coat is applied to the surface of the first polyester layer. The obtained laminated film is slit in the form of a tape and its electromagnetic conversion characteristics are measured with the ML4500B QIC system of Media Logic Co., Ltd. The measurement result is evaluated based on the following criteria when the S/N of the sample of Example 1 is 0 dB.

| ⊚: | +1 dB or more |
|---|---|
| ○: | −1 dB or more and less than +1 dB |
| X: | less than −1 dB |

(12) Preparation of Ester Compound

The following substances are used as an ester compound of an aliphatic monocarboxylic acid having 12 or more carbon atoms and a polyhydric alcohol.

(A); sorbitan tristearate (melting point: 55° C.)
(B); Wax E (melting point of 86° C.) of Hoechst AG obtained by partly saponifying montanic acid diol ester with calcium hydroxide Example 1

A pellet of polyethylene terephthalate (intrinsic viscosity in an o-chlorophenol solvent at 35° C.: 0.6) for the second polyester layer which contained 0.06 wt % of crosslinked silicone resin particles (average particle diameter: 0.3 μm, relative standard deviation of particle size distribution: 0.15) and 0.06 wt % of alumina particles (average particle diameter: 0.1 μm, relative standard deviation of particle size distribution: 0.15) was prepared. A pellet of polyethylene terephthalate (intrinsic viscosity in an o-chlorophenol solution at 35° C.: 0.6) for the first polyester layer which contained 0.01 wt % of crosslinked silicone resin particles (average particle diameter: 0.6 μm, relative standard deviation of particle size distribution: 0.15), 0.15 wt % of crosslinked silicone resin particles (average particle diameter: 0.3 μm, relative standard deviation of particle size distribution: 0.15), 0.15 wt % of alumina particles (average particle diameter: 0.1 μm) and 0.15 wt % of partly saponified ester wax (sorbitan tristearate, melting point of 55° C.) was also prepared.

The pellets of polyethylene terephthalates for the second polyester layer and the first polyester layer were dried at 170° C. for 3 hours, supplied to the respective hoppers of two extruders, molten at a temperature of 300° C., laminated together using a multi-manifold coextrusion die in such a manner that the first polyester layer was placed on one side of the second polyester layer, and extruded onto a casting drum having a surface finish of about 0.3 S and a surface temperature of 25° C. to obtain an unstretched laminated film. The thickness of each layer was adjusted by the delivery rates of the two extruders.

The thus obtained unstretched laminated film was pre-heated at 75° C., stretched to 2.25 times between low-speed and high-speed rolls by heating with an IR heater having a surface temperature of 830° C. 14 mm from above and quenched to obtain a uniaxially oriented laminated polyester film. The obtained uniaxially oriented laminated polyester film was supplied to a stenter without being wound up to be stretched to 3.6 times in a transverse direction at 110° C., pre-heated at 110° C., stretched to 2.5 times in the longitudinal direction again between low-speed and high-speed rolls, supplied to the stenter, and heat set at 210° C. for 10 seconds to obtain a biaxially oriented laminated polyester film having a total thickness of 6.0 μm and a first polyester layer thickness of 1.5 μm. The obtained biaxially oriented laminated polyester film had a Young's modulus in the longitudinal direction of 7.5 GPa and a Young's modulus in the transverse direction of 4.5 GPa.

Thereafter, the following composition was placed in a ball mill and kneaded for 16 hours to be dispersed, and 5 parts by weight of an isocyanate compound (Desmodule L of Bayer AG) was added and dispersed by high-speed shearing for 1 hour to prepare a magnetic coating.

| composition of magnetic coating: | |
|---|---|
| needle-like Fe particle | 100 parts by weight |
| vinyl chloride-vinyl acetate copolymer (Eslec 7A of Sekisui Chemical Co., Ltd.) | 15 parts by weight |
| thermoplastic polyurethane resin | 5 parts by weight |
| chromium oxide | 5 parts by weight |
| carbon black | 5 parts by weight |
| lecithin | 2 parts by weight |
| fatty acid ester | 1 part by weight |
| toluene | 50 parts by weight |
| methyl ethyl ketone | 50 parts by weight |
| cyclohexanone | 50 parts by weight |

This magnetic coating was applied to one side (second polyester layer side) of the above biaxially oriented laminated film to ensure that the thickness of the coating layer after drying should become 0.5 μm, oriented in 2,500 Gauss of a DC magnetic field, dried by heating at 100° C., supercalendered (linear pressure of 200 kg/cm, temperature of 80° C.) and wound up. This wound roll was left in an oven heated at 55° C. for 3 days.

After it was left for 3 days, the following back coat was applied to the opposite side to the magnetic coating side of the biaxially oriented laminated film (first polyester layer side) to ensure that the thickness of the coating layer should become 1 μm, dried and cut to obtain a magnetic tape.

| composition of back coat: | |
|---|---|
| carbon black | 100 parts by weight |
| thermoplastic polyurethane resin | 60 parts by weight |
| isocyanate compound (Colonate L of Nippon Polyurethane Kogyo Co., Ltd.) | 18 parts by weight |
| silicone oil | 0.5 part by weight |
| methyl ethyl ketone | 250 parts by weight |
| toluene | 50 parts by weight |

The characteristic properties of the obtained biaxially oriented laminated polyester film and magnetic tape are shown in Table 1. As obvious from Table 1, they were excellent in winding properties, dimensional change in the crosswise direction by temperature variations, dimensional change in the crosswise direction under load in the longitudinal direction and electromagnetic conversion characteristics.

Example 2

The procedure of Example 1 was repeated except that the types, average particle diameters and amounts of the additive particles were changed as shown in Table 1, (partly saponified) ester wax was changed to Wax E of Hoechst AG (trade name; obtained by partly saponifying montanic acid diol ester with calcium hydroxide), and the amount of the wax was changed to 0.1 wt %. The physical properties of the obtained biaxially oriented laminated polyester film are shown in Table 1.

A magnetic tape was formed from the obtained biaxially oriented laminated polyester film in the same manner as in Example 1. The evaluation results of the obtained magnetic tape are shown in Table 1.

As obvious from this table, they were excellent in winding properties, dimensional change in the crosswise direction by temperature variations, dimensional change in the crosswise direction under load in the longitudinal direction and electromagnetic conversion characteristics.

Example 3

A uniaxially oriented laminated polyester film was obtained in the same manner as in Example 1 except that the types, average particle diameters and amounts of the additive particles and (partly saponified) ester wax were changed as shown in Table 1.

The following aqueous coating solution (solids content of 2 wt %) was applied to the second polyester layer side of the obtained uniaxially oriented laminated polyester film and supplied to a stenter to be stretched to 3.6 times in a transverse direction at 110° C. to form an adhesive layer. Further, the film was pre-heated at 110° C., stretched to 2.5 times in the longitudinal direction again between low-speed and high-speed rolls, supplied to the stenter, and heat set at 210° C. for 10 seconds to obtain a biaxially oriented laminated polyester film having a total thickness of 6.0 μm, a first polyester layer thickness of 1.5 μm and a 0.02 μm-thick adhesive layer.

| composition of coating solution for forming an adhesive layer: | |
|---|---|
| water-dispersible polyester resin (number average molecular weight: about 23,500, composition: 45 mol % of 2,6-naphthalenedicarboxylic acid component, 54.95 mol % of isophthalic acid component, 0.05 mol % of 5-Na sulfoisophthalic acid component, 70 mol % of ethylene glycol component, 30 mol % of bisphenol A adduct with 4 mols of propylene oxide) | 80 wt % |
| polyethylene oxide-monoalkyl ether (number average molecular weight: about 500, alkyl group: mixture of alkyl groups having 12 to 14 carbon atoms) | 10 wt % |
| acrylic resin particles having an average particle diameter of 20 nm | 10 wt % |

A magnetic tape was formed from the obtained biaxially oriented laminated polyester film in the same manner as in Example 1. The evaluation results of the obtained magnetic tape are shown in Table 1.

As obvious from this table, they were excellent in winding properties, dimensional change in —the crosswise direction by temperature variations, dimensional change in the crosswise direction under load in the longitudinal direction and electromagnetic conversion characteristics.

Example 4

An unstretched laminated polyester film was obtained in the same manner as in Example 1 except that the polyesters for the first polyester layer and the second polyester layer were changed to polyethylene-2,6-naphthalene dicarboxylate (intrinsic viscosity in an o-chlorophenol solution at 35° C.: 0.6), the types, average particle diameters and amounts of the inert particles to be contained in the respective layers and the amount of (partly saponified) ester wax were changed as shown in Table 1 and the pellet was dried at 170° C. for 6 hours. The obtained laminated unstretched film was pre-heated at 125° C., stretched to 5.4 times between low-speed and high-speed rolls at a film temperature of 155° C. and quenched to obtain a uniaxially oriented laminated polyester film. The obtained uniaxially oriented laminated polyester film was then supplied to a stenter without being wound up to be stretched to 4.9 times in a transverse direction at 155° C. and heat set with 200° C. hot air for 4 seconds to obtain a biaxially oriented laminated polyester film having a total thickness of 6.0 µm and a first polyester layer thickness of 1.8 µm. The procedure of Example 1 was repeated to form a magnetic tape.

The characteristic properties of the obtained biaxially oriented laminated polyester film and the magnetic tape comprising the same are shown in Table 1. As obvious from Table 1, they were excellent in winding properties, dimensional change in the crosswise direction by temperature variations, dimensional change in the crosswise direction under load in the longitudinal direction and electromagnetic conversion characteristics.

Example 5

The procedure of Example 4 was repeated except that the draw ratio in the longitudinal direction was changed to 4.0 times, the draw ratio in the transverse direction was changed to 5.4 times and the additive particles and the (partly saponified) ester wax were changed as shown in Table 1. The characteristic properties of the obtained biaxially oriented laminated polyester film and tape are shown in Table 1. As shown in Table 1, they were excellent in winding properties, dimensional change in the crosswise direction by temperature variations, dimensional change in the crosswise direction under load in the longitudinal direction and electromagnetic conversion characteristics.

Comparative Example 1, 4 to 8

The procedure of Example 2 was repeated except that the amounts of the additive particles and (partly saponified) ester wax were changed as shown in Table 1.

The characteristic properties of the obtained biaxially oriented laminated polyester film and tape are shown in Table 2. As shown in Table 2, they were unsatisfactory in terms at least one of winding properties, dimensional change in the crosswise direction by temperature variations, dimensional change in the crosswise direction under load in the longitudinal direction and electromagnetic conversion characteristics.

Comparative Example 2

The procedure of Example 1 was repeated except that two-stage orientation was carried out at a draw ratio in the longitudinal direction of 3.7 times and a draw ratio in the transverse direction of 3.7 times (no re-stretching in the longitudinal direction) and the amounts of the additive particles and (partly saponified) ester wax were changed as shown in Table 2.

The characteristic properties of the obtained biaxially oriented laminated polyester film and tape are shown in Table 2. As shown in Table 2, they were unsatisfactory in terms of winding properties and dimensional change in the crosswise direction under load in the longitudinal direction.

Comparative Example 3

The procedure of Example 1 was repeated except that the draw ratio in the longitudinal direction was changed to 2.25 times, the draw ratio in the transverse direction was changed to 3.0 times, the draw ratio of re-stretching in the longitudinal direction was changed to 3.0 times and the amounts of the additive particles and (partly saponified) ester wax were changed as shown in Table 2.

The characteristic properties of the obtained biaxially oriented laminated polyester film and tape are shown in Table 2. As shown in Table 2, they were unsatisfactory in terms of dimensional change in the crosswise direction by temperature variations and electromagnetic conversion characteristics.

TABLE 1

| item | unit | Ex.1 | Ex.2 | Ex.3 | Ex.4 | Ex.5 |
|---|---|---|---|---|---|---|
| polymer | | PET | PET | PET | PEN | PEN |
| Young's modulus | | | | | | |
| longitudinal direction | GPa | 7.5 | 7.5 | 7.5 | 8.0 | 6.0 |
| transverse direction | GPa | 4.5 | 4.5 | 4.5 | 6.5 | 9.0 |
| surface roughness | | | | | | |
| second polyester layer side WRa | nm | 6 | 5 | 1.5 | 2 | 2 |
| first polyester layer side WRa | nm | 10 | 12 | 10 | 8 | 12 |
| WRz | nm | 180 | 170 | 240 | 160 | 150 |
| water contact angle | ° | | | | | |
| first polyester layer side | | 74 | 72 | 86 | 80 | 69 |
| particles added to first polyester layer | | | | | | |
| first inert particles type | — | crosslinked silicone | crosslinked polystyrene | crosslinked silicone | crosslinked silicone | crosslinked silicone |
| average particle diameter | µm | 0.60 | 0.60 | 0.50 | 0.50 | 0.40 |
| relative standard deviation of particle size distribution | — | 0.15 | 0.15 | 0.15 | 0.15 | 0.15 |
| content | wt % | 0.01 | 0.006 | 0.05 | 0.01 | 0.08 |
| particles added to first polyester layer | | | | | | |
| second inert particles type | — | crosslinked silicone | crosslinked silicone | crosslinked silicone | spherical silica | crosslinked silicone |
| average particle diameter | µm | 0.30 | 0.30 | 0.30 | 0.30 | 0.20 |
| relative standard deviation of particle size distribution | — | 0.15 | 0.15 | 0.15 | 0.10 | 0.15 |
| content (x) | wt % | 0.15 | 0.2 | 0.05 | 0.15 | 0.3 |
| third inert particles type | — | alumina | alumina | spherical silica | spherical silica | crosslinked acryl |

TABLE 1-continued

| item | unit | Ex.1 | Ex.2 | Ex.3 | Ex.4 | Ex.5 |
|---|---|---|---|---|---|---|
| average particle diameter | μm | 0.10 | 0.10 | 0.15 | 0.10 | 0.05 |
| relative standard deviation of particle size distribution | — | — | — | 0.10 | 0.10 | 0.15 |
| content | wt % | 0.15 | 0.25 | 0.1 | 0.15 | 0.5 |
| wax added to second polyester layer | | | | | | |
| type | — | sorbitan tristearate | wax E | sorbitan tristearate | sorbitan tristearate | wax E |
| content (y) | wt % | 0.15 | 0.1 | 0.25 | 0.2 | 0.05 |
| −0.5x + 0.15 | wt % | 0.08 | 0.05 | 0.13 | 0.08 | 0.00 |
| −0.5x + 0.30 | wt % | 0.23 | 0.20 | 0.28 | 0.23 | 0.15 |
| particles added to second polyester layer | | | | | | |
| fourth inert particles type | — | | | | spherical silica | crosslinked acryl |
| average particle diameter | μm | | | | 0.10 | 0.05 |
| relative standard deviation of particle size distribution | — | | | | 0.10 | 0.15 |
| content | wt % | | | | 0.01 | 0.2 |
| fifth inert particles type | — | crosslinked silicone | crosslinked silicone | | | |
| average particle diameter | μm | 0.30 | 0.50 | | | |
| relative standard deviation of particle size distribution | — | 0.15 | 0.15 | | | |
| content | wt % | 0.06 | 0.01 | | | |
| sixth inert particles type | — | alumina | alumina | | | |
| average particle diameter | μm | 0.10 | 0.10 | | | |
| relative standard deviation of particle size distribution | — | — | — | | | |
| content | wt % | 0.06 | 0.4 | | | |
| shrinkage factor in crosswise direction under load in longitudinal direction | ppm/g | 9 | 9 | 9 | 8 | 10 |
| temperature expansion coefficient in crosswise direction (αt) | ×10⁻⁶/°C. | 20 | 20 | 20 | 8 | −5 |
| winding properties | — | ○ | ○ | ○ | ○ | ○ |
| dimensional change in crosswise direction under load in longitudinal direction | — | ○ | ○ | ○ | ⊚ | ○ |
| dimensional change in crosswise direction by temperature variations | — | ○ | ○ | ○ | ⊚ | ⊚ |
| electromagnetic conversion characteristics | — | ○ | ○ | ⊚ | ⊚ | ⊚ |

Ex.: Example

TABLE 2

| item | unit | C.Ex.1 | C.Ex.2 | C.Ex.3 | C.Ex.4 |
|---|---|---|---|---|---|
| polymer | | PET | PET | PET | PET |
| Young's modulus | | | | | |
| longitudinal direction | GPa | 7.5 | 5.5 | 9.0 | 7.5 |
| transverse direction | GPa | 4.5 | 5.5 | 3.9 | 4.5 |
| surface roughness | | | | | |
| second polyester layer side WRa | nm | 6 | 6 | 12 | 2 |
| first polyester layer side WRa | nm | 10 | 8 | 22 | 4 |
| WRz | nm | 180 | 150 | 350 | 90 |
| water contact angle | ° | | | | |
| first polyester layer side | | 67 | 92 | 74 | 74 |
| particles added to first polyester layer | | | | | |
| first inert particles type | — | crosslinked silicone | — | crosslinked silicone | crosslinked silicone |
| average particle diameter | μm | 0.60 | | 0.80 | 0.50 |
| relative standard deviation of particle size distribution | — | 0.15 | | 0.15 | 0.15 |
| content | wt % | 0.01 | | 0.1 | 0.01 |

| item | unit | C.Ex.5 | C.Ex.6 | C.Ex.7 | C.Ex.8 |
|---|---|---|---|---|---|
| polymer | | PET | PET | PET | PET |
| Young's modulus | | | | | |

TABLE 2-continued

| | | | | | |
|---|---|---|---|---|---|
| longitudinal direction | GPa | 7.5 | 7.5 | 7.5 | 7.5 |
| transverse direction | GPa | 4.5 | 4.5 | 4.5 | 4.5 |
| surface roughness | | | | | |
| second polyester layer side WRa | nm | 6 | 6 | 6 | 7 |
| first polyester layer side WRa | nm | 7 | 8 | 12 | 16 |
| WRz | nm | 130 | 160 | 200 | 230 |
| water contact angle | ° | | | | |
| first polyester layer side | | 78 | 70 | 82 | 72 |
| particles added to first polyester layer | | | | | |
| first inert particles type | — | crosslinked silicone | crosslinked silicone | crosslinked silicone | crosslinked silicone |
| average particle diameter | μm | 0.60 | 0.60 | 0.60 | 0.60 |
| relative standard deviation of particle size distribution | — | 0.15 | 0.15 | 0.15 | 0.15 |
| content | wt % | 0.01 | 0.01 | 0.01 | 0.01 |
| second inert particles type | — | crosslinked silicone | crosslinked silicone | crosslinked silicone | — |
| average particle diameter | μm | 0.30 | 0.30 | 0.50 | |
| relative standard deviation of particle size distribution | — | 0.15 | 0.15 | 0.15 | |
| content (x) | wt % | 0.15 | 0.15 | 0.2 | |
| third inert particles type | — | alumina | alumina | alumina | alumina |
| average particle diameter | μm | 0.10 | 0.10 | 0.10 | 0.10 |
| relative standard deviation of particle size distribution | — | — | — | — | — |
| content | wt % | 0.15 | 0.15 | 0.4 | 0.15 |

| item | unit | C.Ex.5 | C.Ex.6 | C.Ex.7 | C.Ex.8 |
|---|---|---|---|---|---|
| particles added to first polyester layer | | | | | |
| second inert particles type | — | crosslinked silicone | crosslinked silicone | crosslinked silicone | crosslinked silicone |
| average particle diameter | μm | 0.30 | 0.30 | 0.30 | 0.30 |
| relative standard deviation of particle size distribution | — | 0.15 | 0.15 | 0.15 | 0.15 |
| content (x) | wt % | 0.02 | 0.10 | 0.22 | 0.34 |
| third inert particles type | — | alumina | alumina | alumina | alumina |
| average particle diameter | μm | 0.10 | 0.10 | 0.10 | 0.10 |
| relative standard deviation of particle size distribution | — | — | — | — | — |
| content | wt % | 0.15 | 0.15 | 0.15 | 0.15 |

| item | unit | C.Ex.1 | C.Ex.2 | C.Ex.3 | C.Ex.4 |
|---|---|---|---|---|---|
| wax added to first polyester layer | | | | | |
| type | — | — | sorbitan tristearate | sorbitan tristearate | sorbitan tristearate |
| content (y) | wt % | — | 0.5 | 0.15 | 0.15 |
| $-0.5x + 0.15$ | wt % | 0.08 | 0.08 | 0.05 | 0.15 |
| $-0.5x + 0.30$ | wt % | 0.23 | 0.23 | 0.20 | 0.30 |
| particles added to second polyester layer | | | | | |
| fifth inert particles type | — | crosslinked silicone | crosslinked silicone | spherical silica | spherical silica |
| average particle diameter | μm | 0.30 | 0.30 | 0.30 | 0.10 |
| relative standard deviation of particle size distribution | — | 0.15 | 0.15 | 0.10 | 0.10 |
| content | wt % | 0.06 | 0.06 | 0.3 | 0.01 |
| sixth inert particles type | — | alumina | alumina | | |
| average particle diameter | μm | 0.10 | 0.10 | | |
| relative standard deviation of particle size distribution | — | — | — | | |
| content | wt % | 0.06 | 0.06 | | |

| item | unit | C.Ex.5 | C.Ex.6 | C.Ex.7 | C.Ex.8 |
|---|---|---|---|---|---|
| wax added to first polyester layer | | | | | |
| type | — | sorbitan tristearate | sorbitan tristearate | sorbitan tristearate | sorbitan tristearate |
| content (y) | wt % | 0.18 | 0.06 | 0.22 | 0.10 |
| $-0.5x + 0.15$ | wt % | 0.14 | 0.10 | 0.04 | −0.02 |
| $-0.5x + 0.30$ | wt % | 0.29 | 0.25 | 0.19 | 0.13 |

TABLE 2-continued

| particles added to second polyester layer | | | | | |
|---|---|---|---|---|---|
| fifth inert particles type | — | crosslinked silicone | crosslinked silicone | crosslinked silicone | crosslinked silicone |
| average particle diameter | μm | 0.30 | 0.30 | 0.30 | 0.30 |
| relative standard deviation of particle size distribution | — | 0.15 | 0.15 | 0.15 | 0.15 |
| content | wt % | 0.06 | 0.06 | 0.06 | 0.06 |
| sixth inert particles type | — | alumina | alumina | alumina | alumina |
| average particle diameter | μm | 0.1 | 0.1 | 0.1 | 0.1 |
| relative standard deviation of particle size distribution | — | — | — | — | — |
| content | wt % | 0.06 | 0.06 | 0.06 | 0.06 |

| item | unit | C.Ex.1 | C.Ex.2 | C.Ex.3 | C.Ex.4 |
|---|---|---|---|---|---|
| shrinkage factor in crosswise direction under load in longitudinal direction | ppm/g | 9 | 12 | 7 | 9 |
| temperature expansion coefficient in crosswise direction (αt) | × 10⁻⁶/°C. | 20 | 10 | 25 | 20 |
| winding properties | — | X | X | ○ | X |
| dimensional change in crosswise direction under load in longitudinal direction | — | ○ | X | ○ | ○ |
| dimensional change in crosswise direction by temperature variations | — | ○ | ○ | X | ○ |
| electromagnetic conversion characteristics | — | ○ | ○ | X | ○ |

| item | unit | C.Ex.5 | C.Ex.6 | C.Ex.7 | C.Ex.8 |
|---|---|---|---|---|---|
| shrinkage factor in crosswise direction under load in longitudinal direction | ppm/g | 9 | 9 | 9 | 9 |
| temperature expansion coefficient in crosswise direction (αt) | × 10⁻⁶/°C. | 20 | 20 | 20 | 20 |
| winding properties | — | X | X | X | X |
| dimensional change in crosswise direction under load in longitudinal direction | — | ○ | ○ | ○ | ○ |
| dimensional change in crosswise direction by temperature variations | — | ○ | ○ | ○ | ○ |
| electromagnetic conversion characteristics | — | ○ | ○ | ○ | ○ |

C.Ex.: Comparative Example

What is claimed is:

1. A biaxially oriented laminated polyester film comprising:
   (A) a first polyester layer which contains (1) at least three types of inert particles:
   0.005 to 0.1 wt % of first inert particles having an average particle diameter of 0.4 to 0.7 μm and a relative standard deviation of particle size distribution of 0.5 or less, 0.05 to 0.3 wt % of second inert particles having an average particle diameter of 0.2 μm or more and less than 0.4 μm and a relative standard deviation of particle size distribution of 0.5 or less, and 0.1 to 0.5 wt % of third inert particles having an average particle diameter of 0.01 μm or more and less than 0.2 μm; and 0.05 to 0.25 wt % of an ester compound of an aliphatic monocarboxylic acid having 12 or more carbon atoms and a polyhydric alcohol, in a ratio satisfying the following expression:

$-0.5x+0.15 \leq y \leq -0.5x+0.3$ wherein x is the content (wt %) of the second inert particles and y is the content (wt %) of the ester compound,
   the three types of inert particles showing three clearly distinguishable particle size peaks within the above average particle diameter ranges in a particle size distribution curve, respectively,
   and which has (2) a center plane average surface roughness (WRa) of 5 to 20 nm and a 10-point average surface roughness (WRz) of 100 to 300 nm; and
   (B) a second polyester layer having a center plane average surface roughness (WRa) of 1 to 10 nm, formed on the first polyester layer,
   and having (C) one of Young's moduli in lengthwise and crosswise directions of 6 GPa or more and the other Young's modulus of 4 GPa or more.

2. The biaxially oriented laminated polyester film of claim 1, wherein the first inert particles are crosslinked polymer particles.

3. The biaxially oriented laminated polyester film of claim 1, wherein the first inert particles are of at least one resin selected from the group consisting of crosslinked silicone resin, crosslinked polystyrene resin and crosslinked acrylic resin.

4. The biaxially oriented laminated polyester film of claim 1, wherein the second inert particles are crosslinked polymer particles.

5. The biaxially oriented laminated polyester film of claim 1, wherein the second inert crosslinked polymer fine particles are of at least one resin selected from the group consisting of crosslinked silicone resin, crosslinked polystyrene resin and crosslinked acrylic resin.

6. The biaxially oriented laminated polyester film of claim 1, wherein the third inert particles are of at least one member selected from the group consisting of crosslinked silicone resin, crosslinked polystyrene resin, crosslinked acrylic resin, silica and alumina, and the relative standard deviations of particle size distribution of the above inert particles except alumina are 0.5 or less.

7. The biaxially oriented laminated polyester film of claim 1, wherein the first inert particles and the second inert particles are both crosslinked silicone resin particles.

8. The biaxially oriented laminated polyester film of claim 1, wherein the first inert particles and the second inert particles are both crosslinked silicone resin particles and the third inert particles are alumina particles.

9. The biaxially oriented laminated polyester film of claim 1, wherein the second polyester layer does not contain inert particles.

10. The biaxially oriented laminated polyester film of claim 1, wherein the second polyester layer contains fourth inert particles having an average particle diameter of 0.05 to 0.55 μm and a relative standard deviation of particle size distribution of 0.5 or less in an amount of 0.01 to 0.4 wt %.

11. The biaxially oriented laminated polyester film of claim 1, wherein the second polyester layer contains two types of inert particles:

(1) 0.01 to 0.2 wt % of fifth inert particles having an average particle diameter of 0.2 to 0.55 μm and a relative standard deviation of particle size distribution of 0.5 or less; and (2) 0.01 to 1.0 wt % of sixth inert particles having an average particle diameter of 0.01 to 0.3 μm, the average particle diameter of the fifth inert particles being 0.1 to 0.3 μm larger than the average particle diameter of the sixth inert particles.

12. The biaxially oriented laminated polyester film of claim 11, wherein the fifth inert particles are crosslinked polymer particles.

13. The biaxially oriented laminated polyester film of claim 11, wherein the sixth inert particles are of at least one member selected from the group consisting of crosslinked silicone resin, crosslinked polystyrene resin, crosslinked acrylic resin, silica and alumina having an average particle diameter (secondary particle diameter) of 0.01 to 0.3 μm and the relative standard deviations of particle size distribution of the above inert particles except alumina are 0.5 or less.

14. The biaxially oriented laminated polyester film of claim 1, wherein the first polyester layer has a thickness of 0.1 to 2.5 μm and the second polyester layer has a thickness of 1.0 to 9.5 μm.

15. The biaxially oriented laminated polyester film of claim 1, wherein the thickness ratio of the first polyester layer to the second polyester layer is 1:1 to 1:20.

16. The biaxially oriented laminated polyester film of claim 1 which has a thickness of 2 to 10 μm.

17. The biaxially oriented laminated polyester film of claim 1, wherein the polyester comprises ethylene terephthalate or ethylene-2,6-naphthalene dicarboxylate as the main recurring unit.

18. The biaxially oriented laminated polyester film of claim 1 which has a Young's modulus in a lengthwise direction of 6 GPa or more and a Young's modulus in a crosswise direction of 4 GPa or more, the Young's modulus in the lengthwise direction being equal to or higher than the Young's modulus in the crosswise direction.

19. The biaxially oriented laminated polyester film of claim 1 which has a Young's modulus in a lengthwise direction of 4 GPa or more and a Young's modulus in a crosswise direction of 6 GPa or more, the Young's modulus in the crosswise direction being higher than the Young's modulus in the lengthwise direction.

20. The biaxially oriented laminated polyester film of claim 1, wherein the water contact angle of the surface of the first polyester layer is 68 to 90°.

21. The biaxially oriented laminated polyester film of claim 1 or 9 which further comprises an adhesive layer on the surface not in contact with the first polyester layer or the second polyester layer.

22. The biaxially oriented laminated polyester film of claim 21, wherein the adhesive layer contains seventh inert particles having an average particle diameter of 5 to 100 nm in an amount of 0.5 to 40 wt %.

23. A method for making a magnetic recording medium, comprising forming a magnetic layer on a base film comprising the biaxially oriented laminated film of claim 1.

24. The method of claim 23, wherein the magnetic recording medium is a digital recording medium of a linear recording system.

25. The method of claim 23, wherein the magnetic recording medium is a digital recording medium of an helical recording system.

26. The method of claim 23, wherein the magnetic recording medium is a coated magnetic recording medium.

27. A magnetic recording medium comprising the biaxially oriented laminated polyester film of claim 1 and a magnetic layer formed on the surface of the second polyester layer of the biaxially oriented laminated polyester film.

28. A magnetic recording medium comprising the biaxially oriented laminated polyester film of claim 21 and a magnetic layer formed on the surface of the adhesive layer of the biaxially oriented laminated polyester film.

29. The magnetic recording medium of claim 27 or 28, wherein the magnetic layer is a coating layer.

30. A magnetic recording medium comprising the biaxially oriented laminated polyester film of claim 1, a magnetic layer formed on the surface of the second polyester layer of the biaxially oriented laminated polyester film and a layer for recording a tracking servo signal, formed on the surface of the first polyester layer of the biaxially oriented laminated polyester film.

31. A magnetic recording medium comprising the biaxially oriented laminated polyester film of claim 1, an adhesive layer formed on the surface of the second polyester layer of the biaxially oriented laminated polyester film, a magnetic layer formed on the surface of the adhesive layer and a layer for recording a tracking servo signal, formed on the surface of the first polyester layer of the biaxially oriented laminated polyester film.

* * * * *